Jan. 3, 1928.  1,654,652
A. C. JORDANOFF
VACUUM CLEANER ATTACHMENT FOR MOTOR VEHICLES
Filed March 12, 1926  3 Sheets-Sheet 1
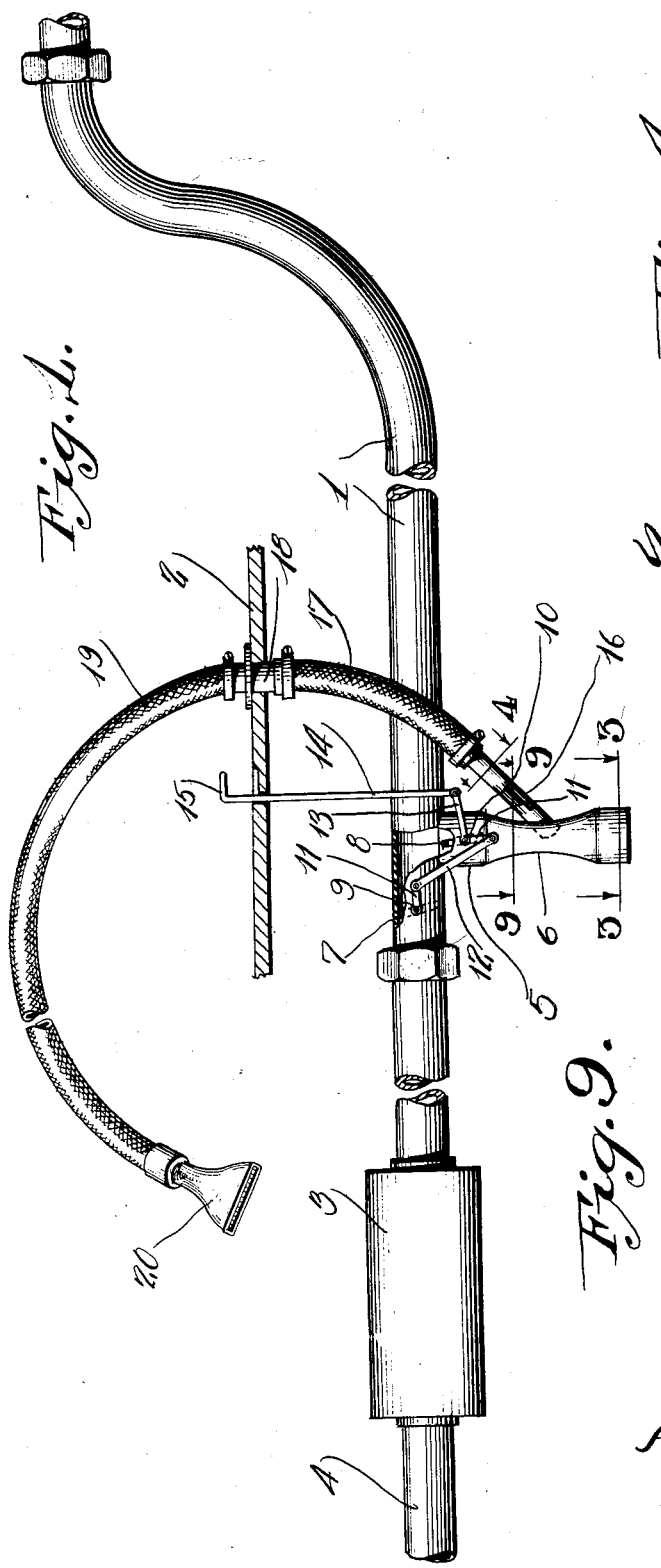
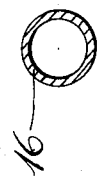
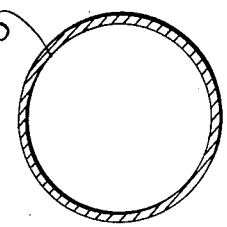
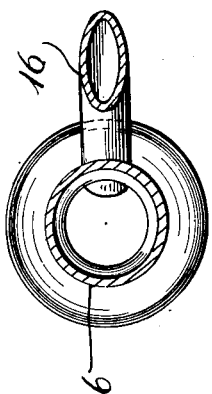
INVENTOR
Assen C. Jordanoff.
BY
ATTORNEY.

Jan. 3, 1928.
A. C. JORDANOFF
1,654,652
VACUUM CLEANER ATTACHMENT FOR MOTOR VEHICLES
Filed March 12, 1926    3 Sheets-Sheet 2
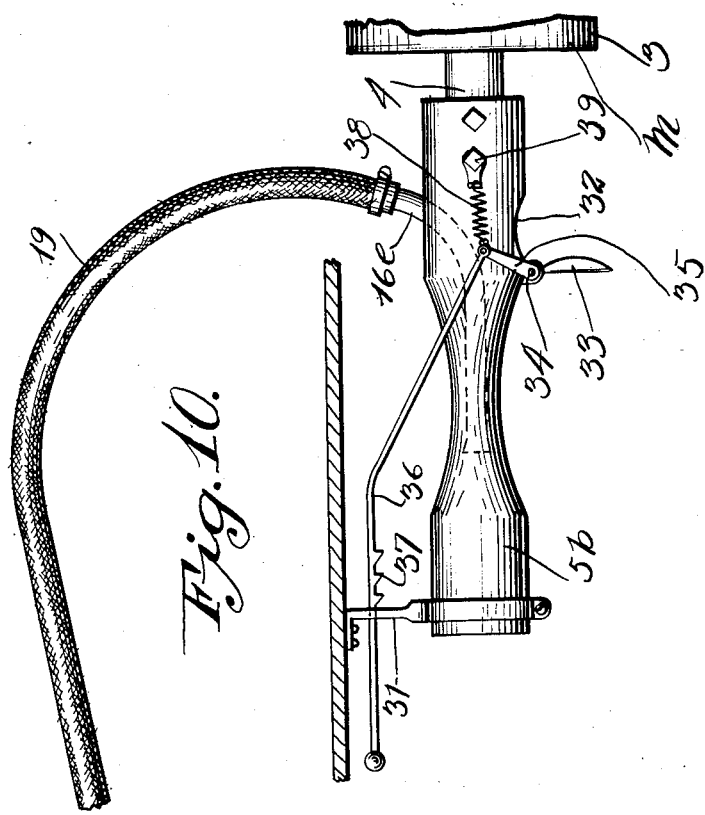
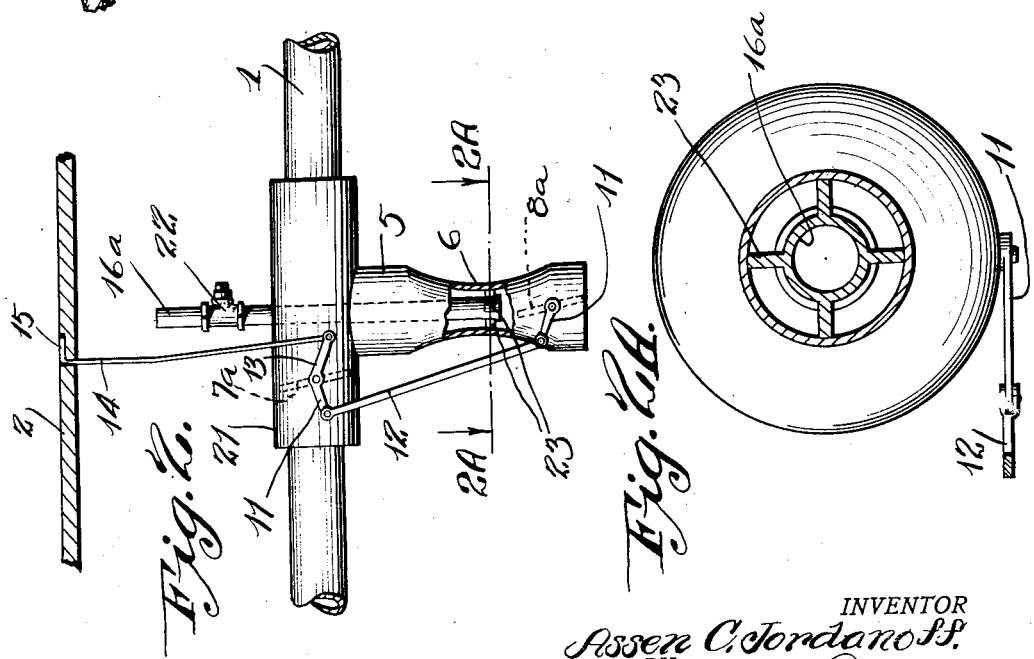
INVENTOR
Assen C. Jordanoff.
BY
ATTORNEY.

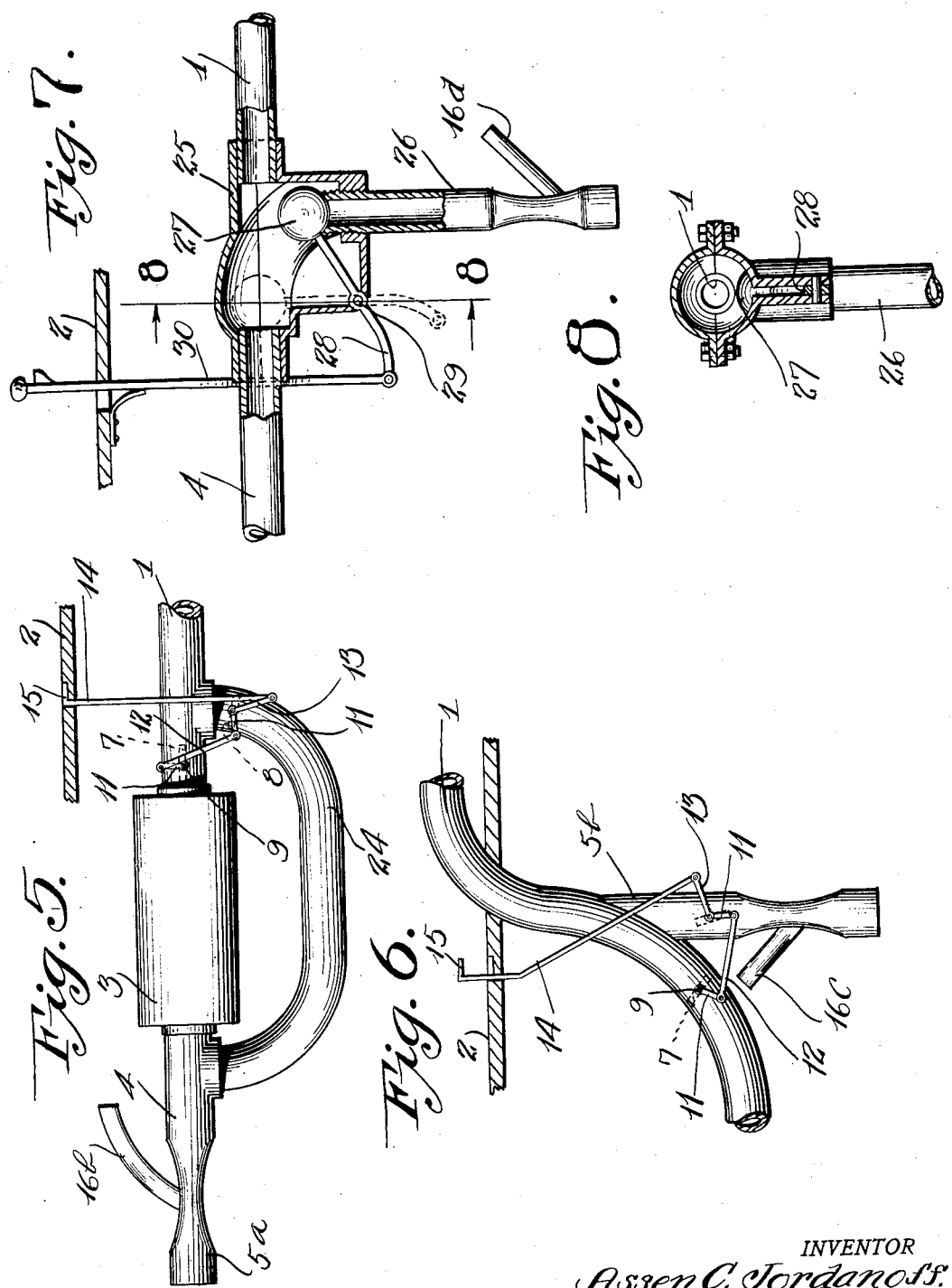

Patented Jan. 3, 1928.

1,654,652

UNITED STATES PATENT OFFICE.

ASSEN C. JORDANOFF, OF NEW YORK, N. Y., ASSIGNOR TO VENERA ACCESSORIES COMPANY, INC., OF NEW YORK, N. Y., A CORPORATION OF NEW YORK.

VACUUM-CLEANER ATTACHMENT FOR MOTOR VEHICLES.

Application filed March 12, 1926. Serial No. 94,356.

This invention relates to certain new and useful improvements in vacuum cleaner attachments for motor vehicles and has for its primary object to utilize the partial vacuum or exhaust created in the exhaust pipe of the motor vehicle engine to produce a suction with a vacuum cleaner member operatively associated with the exhaust pipe.

A further object of the invention is to provide a device of the type above set forth wherein a by-pass, pipe section or Venturi tube is in communication with the exhaust pipe of the vehicle engine with separate valves in the exhaust pipe and device attached thereto under control of a single operating mechanism whereby the exhaust gases may be caused to flow entirely through the exhaust pipe or the suction creating device associated therewith.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a fragmentary side elevational view, partly in section showing the automobile floor, the exhaust pipe for the engine beneath the floor, the suction creating device attached to the exhaust pipe and a vacuum cleaning element communicating with the suction device at a point exteriorly thereof, Figure 2 is a fragmentary side elevational view, similar to Fig. 1 showing another form of the invention wherein the pipe section to which the vacuum cleaning element is attached is positioned inwardly of the suction creating device, Figure 2ᴬ is a horizontal sectional view on line 2ᴬ—2ᴬ of Fig. 2 and drawn to an enlarged scale, Figures 3 and 4 are detail sectional views taken on lines 3—3 and 4—4 of Fig. 1, respectively showing the suction creating device or Venturi tube and the vacuum cleaner pipe section that enters the side wall of the Venturi tube, Figure 5 is a fragmentary side elevational view of another form of the invention wherein a by-pass pipe communicates with the engine exhaust pipe at opposite ends of the muffler with valves for diverting the flow of exhaust gases through the by-pass pipe directly to a Venturi portion formed in the exhaust pipe rearwardly of the muffler, Figure 6 is a fragmentary side elevational view showing the suction creating device connected to the engine exhaust pipe adjacent the forward end, Figure 7 is a vertical longitudinal sectional view of another form of the invention wherein a casing is interposed in the engine exhaust pipe with a suction pipe communicating with the casing and with a single valve for controlling the flow of exhaust gases through the casing, Figure 8 is a detail sectional view taken on line 8—8 of Fig. 7, Figure 9 is a detail sectional view taken on line 9—9 of Fig. 1, and Figure 10 is a side elevational view of another form of the invention wherein a suction device or Venturi tube is alined with and carried by the outlet end of the exhaust pipe.

Referring more in detail to the accompanying drawings, and particularly to Fig. 1, there is illustrated a vacuum cleaning attachment for motor vehicles that is attached to a suction device associated with the engine exhaust pipe, such pipe being designated by the reference numeral 1 that leads from the engine and extends beneath the floor 2 of the automobile body for communication with the muffler 3 and terminal outlet end 4. A pipe section 5 in the form of a Venturi tube that is reduced intermediate its ends as at 6 is in communication with the exhaust pipe 1 and extends at right angles therefrom.

It being the object to control the flow of exhaust gases to cause the gases to flow either into the muffler 3 or the Venturi pipe 5, valves 7 and 8 are mounted in the exhaust pipe and Venturi tube in the relative positions shown in Fig. 1 upon bearing pins 9 and 10 that carry externally positioned arms 11 fixed thereto at one of their ends with the other free ends connected by the link 12 for simultaneous operation, one valve being opened during closing movement of the other valve. The arm 13 connected to the bearing pin 10 carries an operating rod 14 projecting upwardly through the floor 2 of the automobile body and having a handle 15 upon its upper end for operating the same.

A pipe section 16 is attached at one of its ends to the reduced intermediate portion 6 of the Venturi tube 5 and is disposed at an angle thereto as shown in Fig. 1 with the upper end of the pipe section 16 having a flexible tube connection 17 with the floor connector 18, the vacuum hose 19 being detachably connected to the floor connector 18 and having an ordinary vacuum nozzle 20 at its other end. With the vacuum cleaner out of use, the operating rod 14 is depressed to open the valve 7 and close the valve 8 to cause the exhaust gases to flow directly through the exhaust pipe 1, muffler 3 and outlet end 4. When it is desired to use the vacuum cleaner, the valves 7 and 8 are shifted into the positions illustrated to cause the exhaust gases to be diverted through the Venturi tube 5 and in passing through said tube, a suction is created in the pipe section 16, flexible pipe 17 and vacuum hose 19.

In the form of the invention shown in Figs. 2 and 2^A, the exhaust pipe 1 is provided with an enlarged casing section 21 intermediate the ends thereof having the Venturi tube 5 extending at right angles therefrom. The pipe section 16^a is positioned inwardly and centrally of the Venturi tube and extends transversely of the casing 21 with a downwardly opening check valve 22 in the pipe section 16^a above the casing. The lower end of the pipe section 16^a terminates at the reduced portion 6 of the Venturi tube and carries radial arms 23 engaging the tube to insure the axial position of the pipe section. The valves 7^a and 8^a in the casing 21 and lower end of the tube 5 are connected by lever and link devices similar to the valves 7 and 8 in Fig. 1 and are operated in a like manner. With the valves 7^a and 8^a in the positions shown in Fig. 2 the exhaust gases are caused to flow thru the Venturi tube 5 to create a suction in the pipe section 16^a, such suction opening the downwardly opening check valve 22 with the vacuum cleaner element associated with the upper end of the pipe section 16^a. With the valves 7^a and 8^a in their reversed positions, the Venturi tube is closed at its lower end and the exhaust gases continue to flow thru the exhaust pipe and any gas entering the Venturi tube will be prevented from rising in the pipe section 16^a by the check valve 22.

In the form of the invention shown in Fig. 5, the by-pass pipe 24 passing around the muffler 3 communicates at its ends with the exhaust pipe 1, the outlet end 4 of the exhaust pipe carrying a Venturi tube section 5^a with which a pipe section 16^b is associated, the vacuum cleaner element being attached to the pipe section 16^b. Valves 7 and 8 similar to the valves illustrated in Fig. 1 with identical control devices are disposed in the exhaust pipe 1 and by-pass 24 forwardly of the muffler and the exhaust gases are controlled to flow either through the muffler or the by-pass.

Another form of the invention is shown in Fig. 6 wherein the suction creating device is associated with the forward end of the exhaust pipe in proximity of the engine, the Venturi tube 5^b communicating with the exhaust pipe 1 with valves and operating means therefor similar to the showing in Fig. 1 being employed, the Venturi tube 5^b having the pipe section 16^c associated with the reduced portion thereof and to which the vacuum cleaning element is attached.

In the form of the invention shown in Figs. 7 and 8, a casing 25 is interposed between the ends of the exhaust pipe 1 and the bottom wall of said casing has a pipe 26 entering the same with a pipe section 16^d associated with the pipe 26 and to which a vacuum cleaning element is attached. The exhaust gases entering the casing 5 are caused to flow either through the outlet end 4 of the exhaust pipe or the pipe 26 under control of the ball valve 27 carried by the lever arm 28 that is pivotally mounted as at 29 at the lower end of the casing. The operating rod 30 for the arm 28 extends upwardly through the floor 2 of the automobile body and moves the ball valve 27 to either its full or dotted line positions for the purpose described.

In Fig. 10 the Venturi tube 5^b of enlarged formation is attached to and alined with the outlet end 4 of the exhaust pipe and said Venturi tube 5^b is supported at its rear end by the hanger 31. The pipe section 16^e entering the Venturi tube has the flexible hose 19 of a vacuum cleaning element attached thereto. A side opening 32 is formed in the side of the Venturi tube and is adapted to be closed by the valve 33 that is pivotally mounted upon the pin 34, the arm 35 carried by the pin and positioned exteriorly of the tube having one end of an operating rod 36 attached to one end thereof, the operating rod 36 carrying rack teeth 37 to engage a part of the hanger 31 for holding the valve 33 in its closed position. The coil spring 38 attached at one end as at 39 to the Venturi tube with the other end thereof attached to the outer end of the arm 35 normally holds the valve 33 in its open position. With the valve 33 open as illustrated, the exhaust gases flowing thru the Venturi tube will have little effect upon the suction creating pipe section 16^e, but with the valve 33 closed, the force of exhaust gases flowing thru the tube will create the desired suction for operating the vacuum cleaning element.

While there are herein shown and described the preferred embodiments of the present invention, it is nevertheless to be understood that minor changes may be made therein without departing from the spirit and scope of the invention as claimed.

What is claimed is:—

1. In a device of the class described, a fluid pressure pipe, a Venturi tube extending at right angles therefrom and in communication therewith, a valve in the pressure pipe, another valve in the Venturi tube, a single means for operating the two valves to cause one of said valves to close and the other valve to open whereby the fluid pressure is either directed through the pressure pipe or the Venturi tube and a suction pipe having one end enclosed by the Venturi tube with the other end extending transversely through the fluid pressure pipe and terminating outwardly thereof.

2. In a device of the class described, a fluid pressure pipe, a Venturi tube communicating with the pressure pipe, a valve in the pressure pipe, another valve in the outlet end of the Venturi tube, a single means for operating the valves for closing one valve and opening the other valve, a suction pipe extending into the Venturi tube and positioned axially thereof with its inner end terminating inwardly of the Venturi tube valve.

3. In a device of the class described, a fluid pressure pipe, a Venturi tube communicating with the pressure pipe, a valve in the pressure pipe, another valve in the outlet end of the Venturi tube, a single means for operating the valves for closing one valve and opening the other valve, a suction pipe extending into the Venturi tube and positioned axially thereof and a check valve in the upper end of the suction pipe to prevent ingress of fluid under pressure therein.

4. In a device of the class described, a fluid pressure pipe, a Venturi tube communicating with the pressure pipe, a valve in the pressure pipe, another valve in the outlet end of the Venturi tube, a single means for operating the valves for closing one valve and opening the other valve, a suction pipe extending into the Venturi tube and positioned axially thereof and a check valve in the upper end of the suction pipe to prevent ingress of fluid under pressure therein with the inner end of the suction pipe terminating at the reduced portion of the Venturi tube.

In testimony whereof I affix my signature.

ASSEN C. JORDANOFF.